(12) United States Patent
Yamato et al.

(10) Patent No.: US 6,239,241 B1
(45) Date of Patent: May 29, 2001

(54) CONCRETE ADMIXTURE

(75) Inventors: Fuzio Yamato; Haruyuki Sato; Daisuke Hamada; Takahiro Sato; Kyoichi Shirota, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/201,710

(22) Filed: Dec. 1, 1998

(30) Foreign Application Priority Data

Dec. 2, 1997 (JP) .................................................. 9-331377

(51) Int. Cl.$^7$ ...................................................... C08F 20/10
(52) U.S. Cl. .................. 526/318.44; 526/318.4; 526/318.41; 526/318.5; 526/320; 526/328.5; 526/329.6; 526/332
(58) Field of Search .......................... 526/318.4, 318.41, 526/318.44, 318.5, 320, 328.5, 329.6, 332

(56) References Cited

U.S. PATENT DOCUMENTS 5,925,184 * 7/1999 Hirata et al. ........................ 106/696

FOREIGN PATENT DOCUMENTS

| 58-74552 | 5/1983 | (JP) . |
| 62-70250 | 3/1987 | (JP) . |
| 62-70252 | 3/1987 | (JP) . |
| 62-78137 | 4/1987 | (JP) . |
| 62-119147 | 5/1987 | (JP) . |
| 3-75252 | 3/1991 | (JP) . |
| 9-286645 | 11/1997 | (JP) . |

* cited by examiner

Primary Examiner—Helen L. Pezzuto
(74) Attorney, Agent, or Firm—Birch, Stewart, Kolasch & Birch, LLP

(57) ABSTRACT

The present invention is directed to a copolymer for use in a concrete admixture which improves the workability of hydraulic compositions such as cement paste, mortar, concrete and the like. Namely, the admixture effectively reduces the viscosity of the hydraulic compositions under shear without causing setting retardation of the compositions.

6 Claims, No Drawings

CONCRETE ADMIXTURE

FIELD OF THE INVENTION

The present invention is directed to a copolymer for use in a concrete admixture which improves the workability of hydraulic compositions such as cement paste, mortar, concrete and the like. Namely, the admixture effectively reduces the viscosity of the hydraulic compositions under shear without causing setting retardation of the compositions.

DESCRIPTION OF RELATED ART

High-strength concrete is being used in recent multistoried buildings and large constructions. For those, concrete admixtures are required to have the ability to promote water reduction from concrete paste, the ability to reduce the viscosity of concrete paste being forcibly fed under pumping pressure and the ability to inhibit delayed setting of concrete so as to ensure early removal of the molding frames.

Known high-power water-reducing agents for high-strength concrete, include naphthalenesulfonic acid-formalin condensates (naphthalene-based chemicals), melaminesulfonic acid-formalin condensates (melamine-based chemicals), etc. In addition, recently, water-soluble vinyl copolymers such as copolymers of polyalkylene glycol monoester monomers and acrylic and/or dicarboxylic acid monomers (polycarboxylic acid-based chemicals) have been proposed (see, for example, Japanese Patent Application Laid-Open (JP-A) Sho-58-74552, Sho-62-70250, Sho-62-78137, Sho-62-70252, Sho-62-119147, Hei-3-75252, Sho-59-16263), which have excellent dispersibility. Using these water-reducing agents has made it possible to provide high-strength concrete constructions.

However, conventional high-strength concrete compositions have fluidity characteristics similar to Newtonian flow, have high viscosity under high shear, and require an extremely large pumping load when they are forcibly fed under pumping pressure. Under these circumstances, therefore, they are difficult to forcibly feed under pumping pressure.

On the other hand, conventional admixtures may reduce the viscosity of concrete paste under high shear, but often have poor dispersibility. Therefore, when a relatively large amount of admixture is added to high-strength concrete, there is the problem of setting retardation.

Conventional admixtures could not satisfy the two requirements, one being to reduce the viscosity of concrete paste under high shear, and the other being to prevent setting retardation. The object of the present invention is to provide a concrete admixture free from these problems, more precisely to provide a concrete admixture which is useful in the field of high-strength concrete constructions which improves viscosity reduction without causing setting retardation.

SUMMARY OF THE INVENTION

The present inventors previously studied copolymers for concrete admixtures and the influences of the oxyalkylene group (AO) chain length constituting the copolymers and the compositional ratio of comonomers to form the copolymers on the properties of concrete admixtures, especially with respect to the dispersibility retentiveness and the foam stability of the hydraulic composition. The previous studies verified that copolymers of a monomer having a long-chain AO, a monomer having a relatively short-chain AO and a (meth)acrylic or unsaturated dicarboxylic monomer exhibit specific characteristics (see JP-A Hei-7-247150). Given that situation, the present inventors have further studied still other various copolymers in order to improve viscosity reduction without causing setting retardation. As a result, the present inventors have found that specific copolymers not falling within the scope of the Examples of JP-A Hei-7-247150 and not having been taught previously can satisfy the two requirements of viscosity reduction without causing setting retardation.

More specifically, the present inventors have found that copolymers as formed by polymerizing a monomer having a long-chain AO, a monomer having a short-chain AO and a (meth)acrylic acid monomer in a specific ratio have the ability to attain excellent viscosity reduction without causing setting retardation, and thus have completed the present invention.

Accordingly, the present invention is directed to a copolymer having the formula recited below, and a concrete admixture comprising, as the essential component, a copolymer obtained by polymerizing (A) a monomer of the following formula (a); (B) a monomer of the following formula (b); and (C) a monomer of the following formula (c); in a ratio by weight of (A)/(B)/(C)=(51 to 80)/(10 to 45)/(1 to 40)

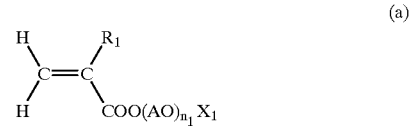

(a)

wherein
R$_1$ is a hydrogen or methyl group;
AO is an oxyalkylene group having 2 or 3 carbon atoms;
n$_1$ is a number of from 80 to 300; and
X$_1$ is a hydrogen, or alkyl group having from 1 to 3 carbon atoms;

(b)

wherein
R$_2$ is a hydrogen or methyl group;
AO is an oxyalkylene group having 2 or 3 carbon atoms;
n$_2$ is a number of from 5 to 30; and
X$_2$ is a hydrogen, or alkyl group having from 1 to 3 carbon atoms;

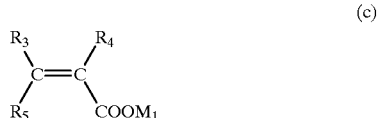

(c)

wherein
R$_3$ to R$_5$ each is a hydrogen, methyl group, or (CH$_2$)mCOOM$_2$;
M$_1$, M$_2$ each is a hydrogen, alkali metal, alkaline earth metal, ammonium, alkylammonium, or substituted alkylammonium; and
m is an integer of from 0 to 2.

The invention further provides a concrete admixture composition comprising, as the essential component, a copolymer as obtained by polymerizing (A) a monomer of formula (a) noted above; (B) a monomer of formula (b) noted above; (C) a monomer of formula (c) noted above; and additionally (D) a monomer of the following general formulae (d-1) to (d-3); and (E) a monomer of the following general formula (e); in a ratio by weight of [(A)+(D)+(E)]/(B)/(C)=(51 to 80)/(10 to 45)/(1 to 40) and in a ratio by weight of (A)/[(D)+(E)]=(50 to 100)/(0 to 50).

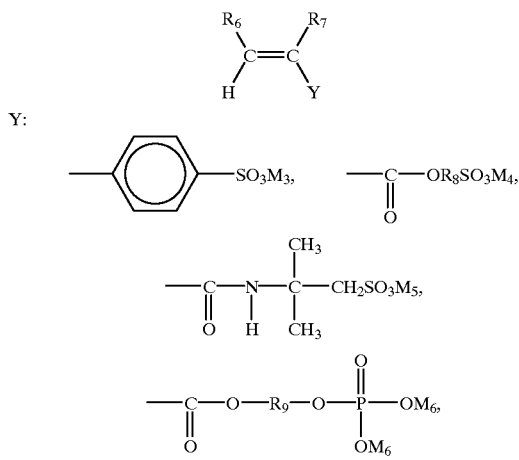

(d-1)

wherein $R_6$, $R_7$ each is a hydrogen or methyl group;

$R_8$, $R_9$ each is an alkylene group having from 2 to 4 carbon atoms;

$M_3$ to $M_6$ each is a hydrogen, alkali metal, alkaline earth metal, ammonium, alkylammonium, or substituted alkylammonium;

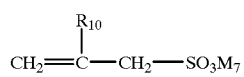

(d-2)

wherein $R_{10}$ each is a hydrogen or methyl group; and $M_7$ each is a hydrogen, alkali metal, alkaline earth metal, ammonium, alkylammonium, or substituted alkylammonium;

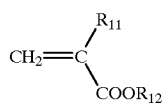

(d-3)

wherein $R_{11}$ is a hydrogen or methyl group; and $R_{12}$ is an alkyl group having from 1 to 6 carbon atoms or an alkenyl group having from 2 to 6 carbon atoms;

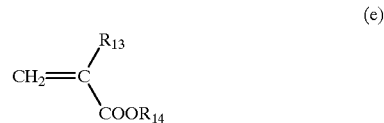

(e)

wherein $R_{13}$ is a hydrogen or methyl group; and $R_{14}$ is a hydroxyalkyl group having from 2 to 6 carbon atoms.

The present invention is also directed to a method of reducing the viscosity without causing setting retardation of a hydraulic composition which comprises adding to said hydraulic composition the copolymer as described above.

DETAILED DESCRIPTION OF THE PREFERRED EMBODIMENTS

Where the concrete admixture of the present invention is used for producing concrete, it is extremely effective for reducing the viscosity of concrete paste even under high shear without causing setting retardation of the concrete. As opposed to this, however, where a mixture of short-chain polymer and long-chain polymer is added to concrete paste, it is presumed that the short-chain polymer will be predominantly adsorbed by concrete in early stages due to the adsorption interference by the long-chain AO, and thereafter the long-chain polymer will then be adsorbed with the passage of time. Thus, in mixture, the two polymers will differ in both the adsorption rate and the adsorption mode, to the cement. Accordingly, it is believed that high concentrations of the short-chain polymer are rapidly absorbed by the cement to cause setting delay, and that the viscosity of the concrete paste is greatly influenced by the characteristics of the long-chain polymer being adsorbed by cement with the lapse of time.

In the case of the inventive cement admixture, it is believed that there will be no difference in terms of the adsorption rate and the adsorption mode of the copolymer used in the present invention which has a long-chain and short-chain graft structure, and that the long-chain moiety of the copolymer will prevent the setting delay while the short-chain moiety thereof will improve the viscosity of the concrete paste. However, the present invention is not limited by such theory and mechanism. The concrete admixture of the invention is especially useful for high-strength concrete, in particular, for that having a design-based strength of higher than 21 N/mm$^2$.

The monomer (A) of formula (a) includes (meth)acrylate esters of alkyl terminated polyalkylene glycols such as methoxypolyethylene glycol, methoxypolyethylene-polypropylene glycol, ethoxypolyethylene-polypropylene glycol and propoxypolyethylene glycol; and ethylene oxide or propylene oxide adducts of (meth)acrylic acid. Preferred are (meth)acrylate esters of polyethylene glycol which are partially terminated with a lower ($C_{1-3}$) alkyl group. The molar number of alkylene oxide units in the polyalkylene glycols may be from 80 to 300, but preferably from 110 to 300, more preferably from 110 to 200. Though depending on the other comonomers, the molar number of less than 80 will result in setting retardation, while the molar number of more than 300 will lower the polymerizability of the monomers and the dispersibility of the copolymer.

The ethylene oxide or propylene oxide adducts of the monomer (A) may be in any form of random addition, block addition or random/block alternate addition.

The monomer (B) of formula (b) may be the same as the polymer (A) except the molar number of alkylene oxide added. In the monomer (B), the molar number of alkylene oxide added is from 5 to 30. This is because the molar number of less than 5 generally lowers the dispersibility of the copolymer, while the molar number of more than 30 will result in increasing the viscosity of concrete paste. Though depending on the other comonomers, the molar number is more preferably from 5 to 25.

The ethylene oxide or propylene oxide adducts of the monomer (B) may be in any form of random addition, block addition or random/block alternate addition.

The monomer (C) of formula (c) includes unsaturated monocarboxylic acid monomers such as acrylic acid, methacrylic acid, crotonic acid; and unsaturated dicarboxylic acid monomers such as maleic anhydride, maleic acid, itaconic anhydride, itaconic acid, and fumaric acid. These may be in any form of alkali metal salts, alkaline earth metal salts, ammonium salts, and amine salts. Preferred are acrylic acid and methacrylic acid.

Where the monomers (A), (B) and (C) that constitute the copolymer of the invention are in a ratio, in terms of reaction units, of (A)/(B)/(C)=(51 to 80)/(10 to 45)/(1 to 40) (by weight), the copolymer satisfies the two requirements of viscosity reduction and setting delay retardation. Preferably, the ratio is (A)/(B)/(C)=(55 to 75)/(15 to 40)/(1 to 40) (by weight), more preferably, (A)/(B)/(C)=(55 to 75)/(15 to 30)/(10 to 20) (by weight).

The monomer (D) of formulae (d-1) to (d-3) includes styrene sulfonic acid and its alkali metal salts, alkaline earth metal salts, ammonium salts, amine salts and substituted amine salts; sulfoalkyl($C_{1-4}$) (meth)acrylates such as sulfoethyl (meth)acrylate, sulfopropyl (meth)acrylate, and their salts such as those noted above; 2-acrylamido-2methylpropane sulfonic acid and its salts such as those noted above; hydroxyalkyl($C_{1-4}$) (meth)acrylate monophosphates such as hydroxyethyl (meth)acrylate monophosphate, and their salts such as those noted above; alkyl (meth) acrylates of which the alkyl moiety is a linear or branched alkyl group having from 1 to 6 carbon atoms, preferably alkyl (meth)acrylates of which the alkyl moiety is a linear or branched alkyl group having from 1 to 3 carbon atoms. Of those, preferred are styrenesulfonic acid, sulfoalkyl($C_{1-4}$) (meth)acrylates and their salts. As the salts, preferred are alkali metal salts.

The monomer (E) of formula (e) includes hydroxyalkyl ($C_2$–$C_6$) (meth)acrylates. $R_{14}$ in formula (e) is preferably a hydroxyalkyl group having from 2 to 4 carbon atoms, as the copolymer has high water-solubility. However, the group $R_{14}$ is not specifically defined with respect to the linear or branched form. Preferred is hydroxyethyl (meth)acrylate.

Where the copolymer that constitutes the concrete admixture of the invention is obtained by polymerizing the monomers (A), (B), (C), (D) and (E), the monomers are in a ratio, in terms of reaction units, of [(A)+(D)+(E)]/(B)/(C)=(51 to 80)/(10 to 45)/(1 to 40) by weight. In view of the two requirements of viscosity reduction and setting retardation, more preferred is [(A)+(D)+(E)]/(B)/(C)=(55 to 75)/(15 to 40)/(2 to 30). The ratio of the monomers (A), (D) and (E) is to be (A)/[(D) +(E)]=(50 to 100)/(0 to 50) by weight. The ratio is preferably (A)/[(D)+(E)]=(55 to 95)/(5 to 45) by weight, from the viewpoint of viscosity reduction without causing setting retardation.

Any other copolymerizable monomers may be copolymerized with those monomers unless they deteriorate or impede the advantages of the invention. Examples of such comonomers include acrylonitrile, acrylamide, methacrylamide, styrene, etc.

The copolymer of the invention can be produced in any known manner. One example of the production is solution polymerization disclosed in, for example, JP-A Sho-59-162163, Sho-62-70250, Sho-62-78137, and U.S. Pat. 4,870,120, 5,137,945. Briefly, the monomers (A), (B) and (C), or the monomers (A), (B), (C), (D) and (E) are polymerized in the defined ratio in a suitable solvent to produce the copolymer. For example, the monomers may be polymerized in water or in a lower alcohol having from 1 to 4 carbon atoms, in the presence of a polymerization initiator such as ammonium persulfate, hydrogen peroxide or the like, to which is optionally added sodium hydrogensulfite, mercaptoethanol or the like, in an $N_2$ atmosphere at 50 to 100° C. for 0.5 to 10 hours.

The weight-average molecular weight (as measured through gel permeation chromatography using a polyethylene glycol standard) of the copolymer in the invention is preferably from 6,000 to 1,000,000, more preferably from 10,000 to 200,000, in view of the fluidity-imparting ability and the fluidity-retaining ability of the copolymer.

If desired, the concrete admixture of the invention may contain a high-power water-reducing agent. Containing such a high-power water-reducing agent, the concrete admixture ensures low viscosity, high initial fluidity and high fluidity retentiveness in a broad blending water/cement (W/C) range.

Examples of high-power water-reducing agents include naphthalene-based compositions (e.g., Mighty® 150, manufactured by Kao Corp.), melamine-based compositions (e.g., Mighty® 150V-2, manufactured by Kao Corp.), aminosulfonate-based compositions (e.g., Paric FP, manufactured by Fujisawa Chemical Co.), polycarboxylate-based compositions (e.g., Mighty® 2000WHZ, manufactured by Kao Corp.), etc. Of known high-power water-reducing agents, preferred are copolymers comprising polyalkylene glycol monoester monomers having from 110 to 300 mols of oxyalkylene groups with from 2 or 3 carbon atoms, and acrylic monomers, which are disclosed in JP-A Hei-7-223852, which are also known as being especially effective for viscosity reduction.

The amount of the concrete admixture of the invention to be added to concrete is preferably from 0.02 to 1.0% by weight, more preferably from 0.05 to 0.5% by weight, in terms of its solid content relative to the cement.

The concrete admixture of the invention may be combined with any other known additives. The additives include, for example, air-entraining (AE) agents, AE water-reducing agents, fluidity promoters, setting retardants, reinforcing agents, setting promoters, foaming agents, deforming agents, viscosity-increasing agents, water-proofing agents, anti-foaming agents, as well as silica sand, blast furnace slag, fly ash, silica fume, etc.

The concrete admixture of the invention is added to cement paste, mortar, concrete and the like, comprising hydraulic cement, by conventional methods. In particular, however, the concrete admixture is suitable to applications under high shear, and is favorably used in high-strength concrete.

Preparation of Monomers

A glass reaction vessel was charged with 100 g of polyethylene glycol methyl ether having 118 moles of ethylene oxide on the average. To this was added 3 g of hydroquinone and 32 g of p-toluene sulfonic acid.

Next, 486 g of methacrylic acid was added, and reacted under reduced pressure at 110° C. for 6 hours. Then, 48% aqueous solution of sodium hydroxide was added for neutralizing.

After that, methacrylic acid remaining was removed by vacuum distillation and washing with alkali. The produced monomer [A-1] exhibited 98.9% esterification as analyzed by H1-NMR.

The other monomers shown as [A-2] to [A-5] and [B-1] to [B-3] also were synthesized as the same manner as above.

Methacrylic acid [C-1], acrylic acid [C-2], methacrylate Na salt [D-1], methyl acrylate [D-2], sodium p-styrene sulfonate [D-3], 2-hydroxyethylene acrylate [E-1] and 2-hydroxyethyl methacrylate [E-2] were obtained from Fine Chemicals Corporation.

2-sulfoethyl methacrylate Na salt [D-1] (Anton MS-2N), was obtained from Nihon Nyukazai K.K. (Japan Emulsifier Corp.)

EXAMPLES

The following examples set forth preferred embodiments of the invention. These embodiments are merely illustrative and are not intended to, and should not be construed to, limit the claimed invention in any way. In the Examples, "%" is defined as "% by weight". The weight-average molecular weight of each copolymer in the the Examples was obtained through gel permeation chromatography, in terms of polyethylene glycol.

The details and the codes of monomers (A), (B), (C), (D) and (E) used in producing the copolymers are shown in Table 1, in which EO indicates ethylene oxide, PO indicates propylene oxide, and the number of moles of EO and PO added is a mean molar number.

TABLE 1

| A-1 | methanol EO adduct methacrylate | (moles of EO added = 118) |
| A-2 | methanol EO adduct methacrylate | (moles of EO added = 180) |
| A-3 | methanol EO adduct acrylate | (moles of EO added = 275) |
| A-4 | methanol EO/PO random adduct methacrylate | (EO = 125, PO = 10) |
| A-5 | methanol EO adduct methacrylate | (moles of EO added = 350) |

TABLE 1-continued

| B-1 | methanol EO adduct acrylate | (moles of EO added = 25) |
| B-2 | methanol EO adduct methacrylate | (moles of EO added = 9) |
| B-3 | methanol EO adduct acrylate | (moles of EO added = 65) |
| C-1 | methacrylic acid | |
| C-2 | acrylic acid | |
| D-1 | 2-sulfoethyl methacrylate Na salt | |
| D-2 | methyl acrylate | |
| D-3 | Na p-styrenesulfonate | |
| E-1 | 2-hydroxyethyl acrylate | |
| E-2 | 2-hydroxyethyl methacrylate | |

Production Example of admixture No. 3 is mentioned below. Other admixtures Nos. 1 to 14 were produced in the same manner as that for No. 3, and their compositions and molecular weights are shown in Table 2.

Production Example (admixture No. 3)

340 parts by weight of water was put into a reactor equipped with a stirrer, then purged with nitrogen under stirring, and heated up to 75° C. in the nitrogen atmosphere. Next, a mixture of 270 parts by weight of A-1, 112.5 parts by weight of B-2 and 67.5 parts by weight of C-1 were dissolved in 292.5 parts by weight of water; 36.3 parts by weight of an aqueous solution of 20% ammonium persulfate; and 39 parts by weight of an aqueous solution of 20% 2-mercaptoethanol were all together dropped into the reactor over a period of 2 hours. Next, 12.1 parts by weight of an aqueous solution of 20% ammonium persulfate was dropped thereinto over a period of 30 minutes, and the resulting mixture was reacted at the same temperature (75° C.) for 1 hour. After having been thus reacted, the mixture was heated up to 95° C., to which was dropwise added 10.3 parts by weight of 35% hydrogen peroxide over a period of 30 minutes, and then further reacted at the same temperature (95° C.) for 2 hours. After the reaction was completed, the mixture was neutralized with 47.1 parts by weight of 48% sodium hydroxide to obtain a copolymer having a molecular weight of 65,000.

TABLE 2

| Admixture No. | (A) | wt. % | (B) | wt. % | (C) | wt. % | (D) | wt. % | (E) | wt. % | Molecular Weight |
|---|---|---|---|---|---|---|---|---|---|---|---|
| 1 | A-1 | 55 | B-2 | 25 | C-1 | 20 | — | 0 | — | 0 | 25,000 |
| 2 | A-2 | 75 | B-1 | 15 | C-2 | 10 | — | 0 | — | 0 | 77,000 |
| 3 | A-1 | 60 | B-2 | 25 | C-1 | 15 | — | 0 | — | 0 | 65,000 |
| 4 | A-2 | 70 | B-1 | 15 | C-2 | 10 | — | 0 | E-1 | 5 | 28,000 |
| 5 | A-3 | 45 | B-2 | 15 | C-1 | 25 | D-1 | 10 | E-2 | 5 | 32,000 |
| 6 | A-1 | 55 | B-2 | 22 | C-1 | 3 | D-2 | 20 | — | 0 | 55,000 |
| 7 | A-4 | 60 | B-1 | 20 | C-1 | 15 | D-3 | 5 | — | 0 | 46,000 |
| 8 | A-1 | 90 | — | 0 | C-1 | 10 | — | 0 | — | 0 | 70,000 |
| 9 | — | 0 | B-2 | 75 | C-1 | 25 | — | 0 | — | 0 | 33,000 |
| 10 | A-5 | 60 | B-1 | 20 | C-2 | 20 | — | 0 | — | 0 | 22,000 |
| 11 | A-1 | 55 | B-3 | 25 | C-2 | 20 | — | 0 | — | 0 | 50,000 |
| 12 | — | 0 | B-3 | 85 | C-1 | 15 | — | 0 | — | 0 | 43,000 |
| 13 | A-1 | 13 | B-2 | 53 | C-1 | 34 | — | 0 | — | 0 | 38,000 |
| 14 | A-2 | 90 | B-1 | 5 | C-1 | 5 | — | 0 | — | 0 | 105,000 |

Evaluation of Concrete Admixture

The details of concrete formulation are shown in Table

TABLE 3

Concrete Formulation and Constituent Materials

| W/C (%) | s/a (%) | Unit Amount (kg/m³) | | | |
|---|---|---|---|---|---|
| | | C | W | S | G |
| 29.0 | 44.7 | 587 | 170 | 712 | 941 |

Constituent Materials
W: City water
C: Low exothermic Portland cement, specific gravity = 3.22
S: River sand from Kinokawa River, specific gravity = 2.58
G: Crushed stones from Wakayama specific gravity = 2.75
s/a: sand/(sand + ballast) (by volume)

The following Table 4 shows the ratio of admixture No. 8 to admixture No. 9 in preparing comparative admixtures Nos. 15 to 18, of which the test data are in Table 5.

TABLE 4

| Admixture No. | Ratio of Admixture No. 8/Admixture No. 9 | Wt. % in terms of copolymers | | |
|---|---|---|---|---|
| | | A-1 | B-2 | C-1 |
| 9  | 0/100   | 0  | 75   | 25   |
| 15 | 30/70   | 27 | 52.5 | 20.5 |
| 16 | 50/50   | 45 | 37.5 | 17.5 |
| 17 | 70/30   | 63 | 22.5 | 14.5 |
| 18 | 90/10   | 81 | 7.5  | 12.5 |
| 8  | 100/0   | 90 | 0    | 10   |

To produce concrete, the materials and the admixture were kneaded in a forced double-screw mixer for 90 seconds. The amount of the admixture of the present invention added and that of the comparative admixture added were so adjusted that the initial fluidity (slump flow value) of the concrete paste was 60±5 cm. Accordingly, the smaller amount of solid content added relative to the cement indicates better dispersibility of the admixture. In addition, the initial air intake of the concrete paste was maintained to 2±0.5%, by adding thereto an entraining agent (Mighty® AE-03, manufactured by Kao Corp.) and an antifoaming agent (Antifoam E-20, manufactured by Kao Corp.). Upon testing the concrete compositions for their fluidity under high shear, the spreading speed (seconds) was measured for each concrete composition having a slump flow value of 50 cm. The shorter time measured indicates better fluidity of the concrete composition.

In the setting test, each concrete composition was sieved d through a 5-mm sieve, and the mortar having passed through the sieve was tested using a penetration meter. The cement mixtures free from setting retardation were evaluated to be good.

The slump flow value was measured according to JIS-A1101. The air intake amount was measured according to JIS-A1128, and the setting time was measured according to ASTM-C403.

The test data obtained are shown in Table 5.

TABLE 5

| Group | Admixture No. | Amount Added (%) | Slump Value (cm) | Spreading Speed | | Setting Time | |
|---|---|---|---|---|---|---|---|
| | | | | seconds | evaluation | hours-minutes | evaluation |
| Samples of the Invention | 1  | 0.20 | 58 | 5.5 | B | 6-23 | A |
|  | 2  | 0.18 | 60 | 5.8 | B | 6-05 | A |
|  | 3  | 0.19 | 59 | 4.9 | A | 6-10 | A |
|  | 4  | 0.23 | 60 | 5.7 | B | 6-03 | A |
|  | 5  | 0.25 | 61 | 5.7 | B | 6-10 | A |
|  | 6  | 0.21 | 58 | 5.9 | B | 6-05 | A |
|  | 7  | 0.20 | 60 | 5.1 | B | 6-06 | A |
| Comparative Samples | 8  | 0.20 | 57 | 8.5 | D | 6-21 | A |
|  | 9  | 0.30 | 63 | 6.0 | B | 9-59 | C |
|  | 10 | 0.35 | 62 | 9.9 | D | 6-13 | A |
|  | 11 | 0.23 | 58 | 8.2 | D | 6-23 | A |
|  | 12 | 0.27 | 62 | 6.9 | C | 8-57 | C |
|  | 13 | 0.23 | 60 | 6.0 | B | 9-02 | C |
|  | 14 | 0.27 | 62 | 7.8 | D | 6-10 | A |
|  | 15 | 0.32 | 60 | 6.4 | C | 8-56 | C |
|  | 16 | 0.28 | 61 | 6.8 | C | 8-23 | C |
|  | 17 | 0.26 | 60 | 7.6 | D | 7-23 | C |
|  | 18 | 0.24 | 59 | 8.4 | D | 6-35 | B |
| Ex 5 of JP-A-Hei 7-247150 | 19 | 0.25 | 58 | 5.6 | B | 7-51 | C |

TABLE 5-continued

| Group | Admixture No. | Amount Added (%) | Slump Value (cm) | Spreading Speed | | Setting Time | |
|---|---|---|---|---|---|---|---|
| | | | | seconds | evaluation | hours-minutes | evaluation |
| Ex 7 of JP-A-Hei 7-427150 | 20 | 0.25 | 60 | 5.5 | B | 8-15 | C |

Evaluation for viscosity (spreading speed):
A: shorter than 5 seconds
B: from 5 to 6 seconds
C: from 6 to 7 seconds
D: longer than 7 seconds
Evaluation for setting time:
A: shorter than 6-30
B: from 6-30 to 7
C: longer than 7

From Table 5, it is clear that the concrete admixtures of the invention are superior to the comparative admixtures, with respect to improving the fluidity of the concrete compositions without causing setting retardation thereof. Specifically, adding the concrete admixture of the invention to high-strength concrete compositions makes it easy to forcedly feed the compositions under pumping pressure. In addition, since the concrete admixture of the invention does not cause setting retardation, it ensures early removal of the molding frames and thereby shortening worktime.

From the test data of comparative admixtures Nos. 8, 9 and 15 to 18, it is known that the mere mixing of a long-chain AO polymer and a short-chain AO polymer exhibit additive effects only. Whereas, admixtures Nos. 1 and 3 of the invention for which the weight ratio of the constituent monomers is between those for comparative admixtures Nos. 16 and 17 have better dispersibility, while further improving the fluidity of concrete paste under shear without inducing setting retardation, and it was shown that the admixtures comprising the copolymer of the invention exhibit synergistic effects.

Comparative admixture No. 12 was produced from monomer of which the AO chain length is shorter than that of the monomer (A) but longer than that of the monomer (B). As is known from the test data of this comparative admixture No. 12, replacing the monomer of that type for the monomers (A) and (B) could not produce a polymer having the intended properties. Only the copolymer as produced by copolymerizing the long-chain AO monomer and the short-chain AO monomer in a weight ratio as specifically defined herein can satisfy viscosity reduction under high shear without causing setting retardation.

What is claimed is:

1. A copolymer comprising:
(A) a monomer of the following formula (a); (B) a monomer of the following formula (b); and (C) a monomer of the following formula (c); in a ratio by weight of (A)/(B)/(C)=(51 to 80)/(10 to 45)/(1 to 40)

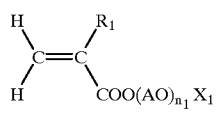

(a)

wherein
$R_1$ is a hydrogen or methyl group;
AO is an oxyalkylene group having 2 or 3 carbon atoms;
$n_1$ is a number of from 80 to 300; and
$X_1$ is a hydrogen, or alkyl group having from 1 to 3 carbon atoms;

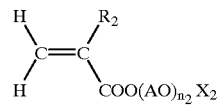

(b)

wherein
$R_2$ is a hydrogen or methyl group;
AO is an oxyalkylene group having 2 or 3 carbon atoms;
$n_2$ is a number of from 5 to 30; and
$X_2$ is a hydrogen, or alkyl group having from 1 to 3 carbon atoms;

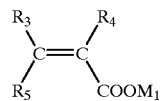

(c)

wherein
$R_3$ to $R_5$ each is a hydrogen, methyl group, or $(CH_2)mCOOM_2$;
$M_1$ and $M_2$ are each individually a hydrogen, alkali metal, alkaline earth metal, ammonium, alkylammonium, or substituted alkylammonium; and
m is an integer of from 0 to 2.

2. The copolymer of claim 1, wherein the monomer (A) is a (meth)acrylate ester of a polyethylene glycol which is at least partially terminated with a lower ($C_{1-3}$) alkyl group, the monomer (B) is an acrylate or methacrylate ester of a polyethylene glycol which is partially terminated with a lower ($C_{1-3}$) alkyl group, and the monomer (C) is acrylic or methacrylic acid.

3. The copolymer of claim 1, wherein $n_1$ is a number of from 110 to 200.

4. The copolymer of claim 1, wherein $n_2$ is a number of from 5 to 25.

5. The copolymer of claim 1, wherein the ratio of (A)/(B)/(C) is (55 to 75)/(15 to 40)/(1 to 40).

6. The copolymer of claim 1, wherein the copolymer has a weight-average molecular weight of from 6,000 to 1,000,000.

* * * * *